United States Patent
Purta et al.

(10) Patent No.: US 6,514,417 B2
(45) Date of Patent: Feb. 4, 2003

(54) MICROWAVE ASSISTED CLEANING AND RECLAMATION OF INDUSTRIAL WASTES

(75) Inventors: David A. Purta, Gibsonia, PA (US); Alberto M. Guzman, Pittsburgh, PA (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 0 days.

(21) Appl. No.: 09/861,821

(22) Filed: May 21, 2001

(65) Prior Publication Data

US 2002/0070174 A1 Jun. 13, 2002

Related U.S. Application Data

(60) Continuation-in-part of application No. 09/123,566, filed on Jul. 27, 1998, now abandoned, which is a division of application No. 08/482,258, filed on Jun. 7, 1995, now Pat. No. 5,785,847.

(51) Int. Cl.⁷ .............................................. B01D 35/06
(52) U.S. Cl. ........................ 210/695; 210/748; 210/772
(58) Field of Search ................................ 210/695, 748, 210/768, 772, 776, 799, 805; 134/1

(56) References Cited

U.S. PATENT DOCUMENTS

| | | | |
|---|---|---|---|
| 4,582,629 A | 4/1986 | Wolf | 252/348 |
| 4,810,375 A | 3/1989 | Hudgins et al. | 210/112 |
| 4,853,119 A | 8/1989 | Wolf et al. | 210/181 |
| 4,853,507 A | 8/1989 | Samardzija | 219/10.55 |
| 4,855,695 A | 8/1989 | Samardzija | 333/17.3 |
| 4,889,639 A | 12/1989 | Hudgins et al. | 210/739 |
| 5,147,554 A | 9/1992 | Heck | 210/748 |
| 5,785,847 A | 7/1998 | Purta et al. | 210/177 |

FOREIGN PATENT DOCUMENTS

| | | |
|---|---|---|
| JP | 12905 | 5/1978 |
| JP | 53-12905 | 6/1978 |
| JP | 59-115716 | 12/1982 |

*Primary Examiner*—Matthew O. Savage
(74) *Attorney, Agent, or Firm*—Fish & Richardson P.C.

(57) ABSTRACT

The present invention provides a process and apparatus for cleaning and reclamation of an industrial waste containing oily metallic solids by magnetically concentrating the oily magnetic solids, mixing the concentrated solids with a chemical release agent, applying microwave radiation to the mixture, and separately collecting the clean metallic solids and recovered oil components.

8 Claims, 3 Drawing Sheets

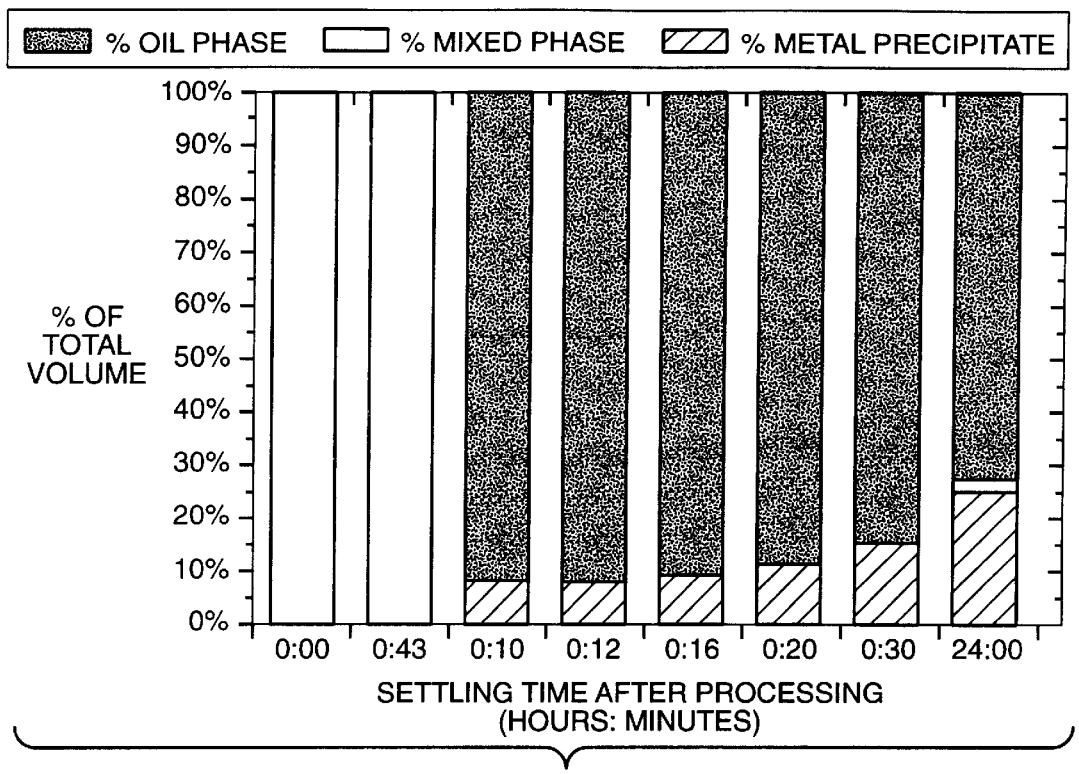
FIG._2A
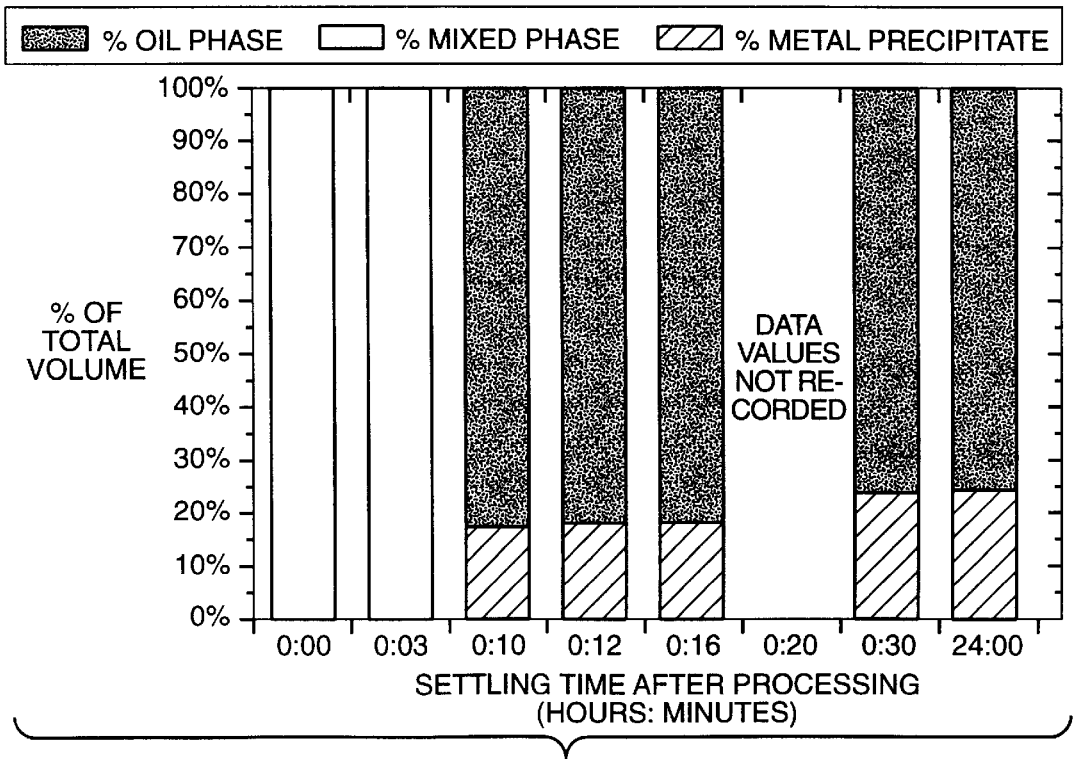
FIG._2B

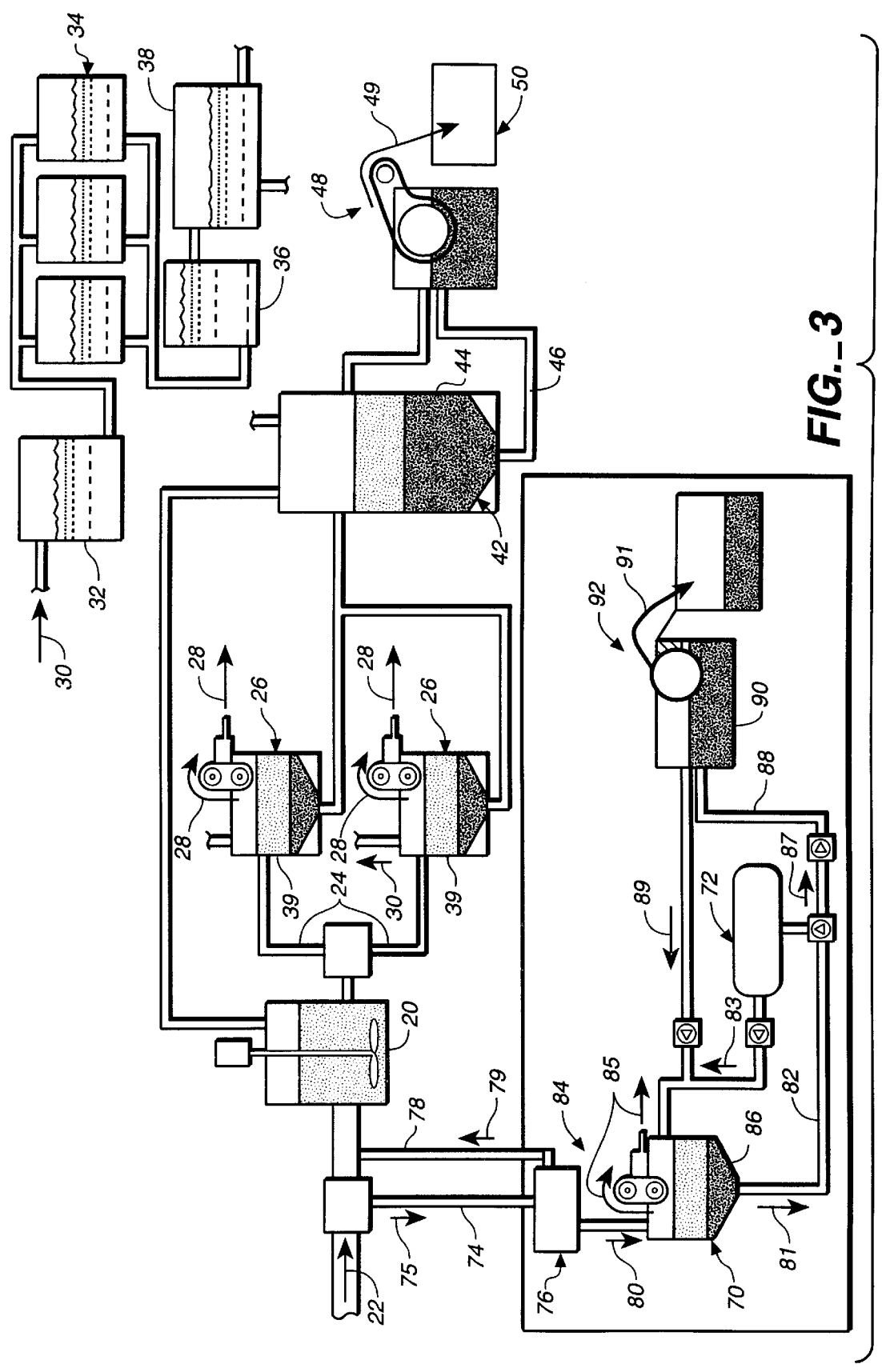
FIG._3

US 6,514,417 B2

MICROWAVE ASSISTED CLEANING AND RECLAMATION OF INDUSTRIAL WASTES

This is a continuation-in-part of U.S. application Ser. No. 09/123,566, filed Jul. 27, 1998 now abandoned, which is a divisional of U.S. application Ser. No. 08/482,258, filed Jun. 7, 1995, U.S. Pat. No. 5,785,847, the disclosures of which are incorporated by reference in its entirety.

The present invention relates generally to treatment of industrial wastes, and more particularly to microwave assisted cleaning and reclamation of oily metallic industrial wastes.

BACKGROUND OF THE INVENTION

Several industrial processes produce oily mixed wastes. One example is hot strip rolling steel mills. Cooling water from these mills generally contains oily metallic particles. Typical treatment processes for these wastes use tanks and chemicals for flocculating, settling, thickening, de-watering, and stiffening to produce concentrated waste sludge.

FIG. 1 shows a block diagram of a typical treatment plant for processing oily cooling water from a hot strip rolling mill. The waste effluent enters a rapid mix tank 20, as shown by arrow 22, where it is mixed with an anionic polymer. From there, it proceeds through conduits 24 to clarifying tanks 26, as shown by arrows 25, where oil is skimmed off, as shown by arrows 28, and water is removed, as shown by arrows 30, and directed to a wet well 32. From the wet well 32, the water is directed through pressure filters 34, a cooling tower 36, and into a cold well 38, as shown by arrows 33, 35 and 37, to provide a source of cooling water for the mill again.

The remaining waste 39 from the clarifying tanks 26 is directed through conduits 40 to thickening tank 42, as shown by arrows 41, where anionic and/or cationic polymers, and/or sulfuric acid are added. The thickened waste 44 is then directed through conduit 46 to drum filter 48, as shown by arrow 47, and finally deposited as a waste sludge cake in receptacle 50, as shown by arrow 49.

The sludge volume is typically approximately ⅓ water, ⅓ oil, and ⅓ iron metal and iron oxides, to which lime is added for stiffening. The waste sludge is typically disposed of in a special landfill or trucked to a special processing plant external to the producing, company.

A typical hot strip rolling mill can generate 50 tons of sludge per day and more than 7,000 tons per year. The costs associated with production and disposal of this sludge are significant.

Moreover, conventional water treatment processes are time consuming, and plant equipment is very bulky, requiring extensive housing space at mill facilities. Also, as land fills reach capacity, the cost of disposal of mill waste sludge can be expected to increase.

Accordingly, there is a need for faster, smaller and more economical industrial waste water treatment systems.

There are many known processes for the separation of oil and water emulsions. These processes are commonly referred to as emulsion cracking. Emulsion cracking typically needs the addition of heat and frequently requires deemulsifying chemical agents. Processing times using gravity settling methods often require 4 to 24 hours for better than 90% separation.

Recently, oil/water emulsion cracking systems using microwave energy have been successfully field tested and are currently being developed, mainly for the petroleum industry. Microwave emulsion cracking systems are compact and have demonstrated rapid, continuous, processing at flow rates to beyond 50 gallons-per-minute (gpm), through the use of flow through microwave applicators. Efficient microwave processing typically requires only a 20° C. process temperature rise and uses power, for example, at an 8 to 12 kilowatts per gallon per minute (kW/gpm)power processing rate. For some applications, microwave emulsion cracking has the added benefit of not requiring the addition of chemicals.

While these methods may improve the separation of oil-water emulsions, they do not address the distinct problem of additionally separating oil from metallic solids frequently present in industrial waste effluents, such as cooling water from hot strip rolling mills. Accordingly, it is an object of the present invention to provide a method for treating industrial wastes containing oily metallic solids by separating a waste into its various components for reclamation and reuse, thereby significantly reducing or eliminating waste sludge. It is also an object of the present invention to provide waste water treatment process equipment that is faster and more compact than that presently typically used.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the claims.

The present invention provides a process and apparatus for cleaning and reclamation of an industrial waste containing oily metallic solids by magnetically concentrating the oily magnetic solids, mixing the concentrated solids with a chemical release agent, applying microwave radiation to the mixture, and separately collecting the clean metallic solids and recovered oil components.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

FIG. 2A is a graph showing the results the experimental treatment of magnetically concentrated oily metallic waste with oil release agent and conventional heating.

FIG. 2B is a graph showing the results the experimental treatment of magnetically concentrated oily metallic waste with oil release agent and microwave radiation.

FIG. 3 is a schematic diagram of a waste water treatment plant in accordance with a preferred embodiment of the present invention.

DETAILED DESCRIPTION OF THE INVENTION

Figure 1:
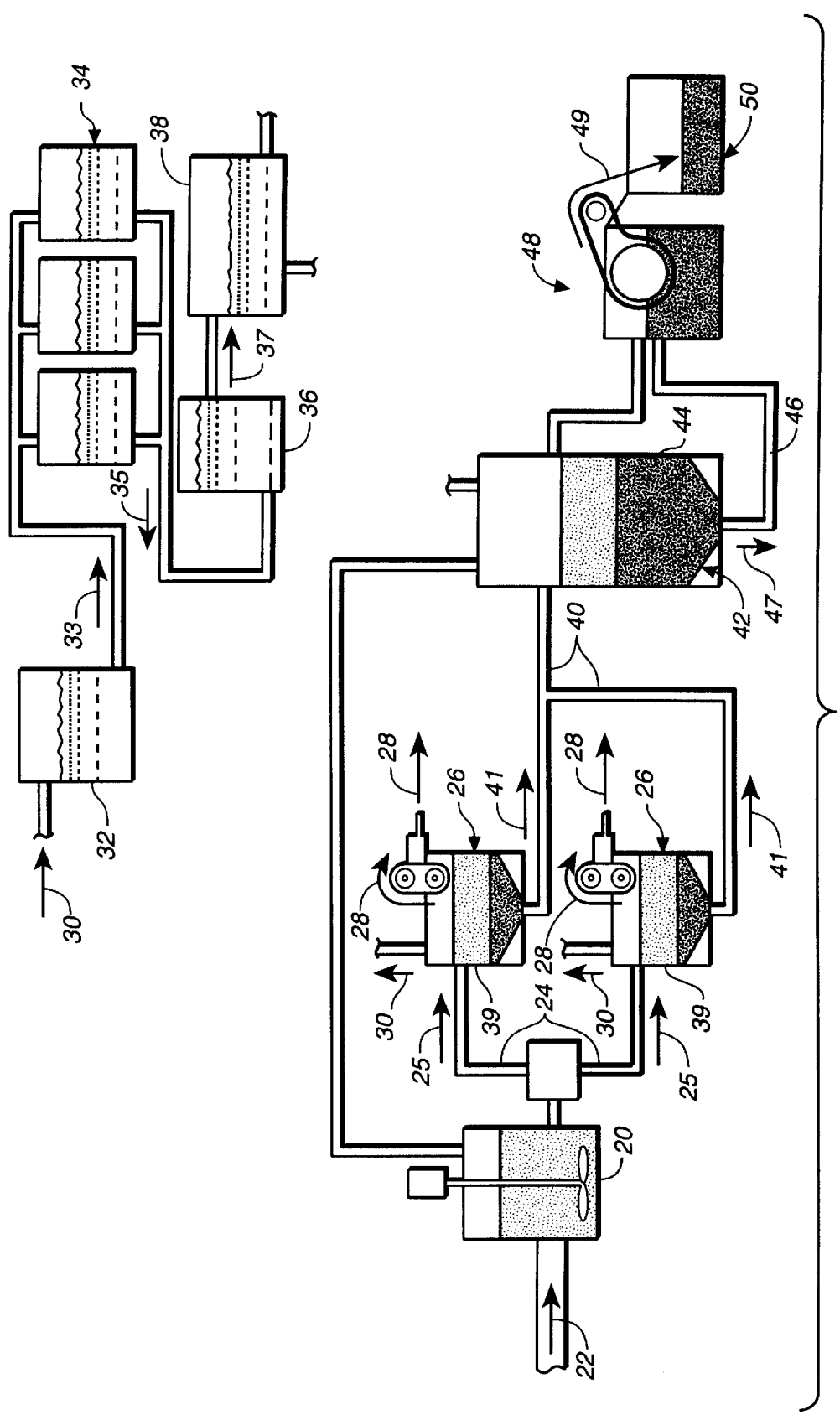
FIG. 1 is a schematic diagram of a typical prior art waste water treatment plant.

The present invention is described below in terms of a preferred embodiment, that of a microwave process system that is retrofitted alongside an exiting waste water processing system. The process system may also be installed as an alternative to a conventional waste water processing system.

There are two main steps in the microwave waste recovery process. The first step magnetically concentrates the oily metallic particle solids from the industrial waste effluent. The second step separates the oil from the metallic solids using microwave processing. FIG. 3 shows a microwave waste recovery process system installed in a typical water treatment plant for hot strip rolling mill effluent. A system uses state-of-the-art, fully automatic batch processing. Batch processing may use a clarifier 70 which is filled and then separated in repeating cycles. Continuous processing can be enhanced by adding a second batch clarifier following the microwave process chamber 72 (not shown).

Further, the microwave process chamber may be followed by a centrifuge to continuously separate the solids from the process fluid. The centrifuge may also be followed by an oil-water coalescer or liquid-liquid centrifuge to continuously separate the oil from the chemical release agent. The system may also incorporate bulk storage tanks containing the chemical release agent to be used for slurrying the sludges.

Referring to FIG. 3, the first step in the microwave waste recovery process is to divert the mill's cooling water process stream through conduit 74 to an industrial size magnetic concentrator 76, as shown by arrow 75. The oily metallic solids in this stream are then magnetically separated and concentrated. Concentration is performed to reduce the microwave process-flow-rates, tank sizes, and system volume. The water stream, now stripped of oily metallic solids, is returned to the rapid mix tank 20 of the conventional system through conduit 78, as shown by arrow 79. Alternatively, where the microwave process system replaces a conventional waste water process system, water from the clarification step may be diverted from arrow 79, as shown by arrows 30, to a wet well 32. From the wet well 32, the water may be directed through pressure filters 34, a cooling tower 36, and into a cold well 38 to provide a source of cooling water for the mill again.

Magnetic concentration systems for use with steel manufacturing waste water effluent have previously been successfully demonstrated by pilot systems in the Unites States, Sweden, and Japan. These magnetic concentration systems are referred to as High Gradient Magnetic Separation (HGMS) devices. Commercial, full production scale, units have been installed and successfully utilized in Japan to remove suspended oily metallic solids in hot strip rolling mill waste water, continuous casting waste water, and other related applications.

HGMS systems are practical, compact, and efficient. These systems typically require less than one-tenth the plant floor area of older clarifier and settling tank equipment hardware. Magnetic filtration efficiencies of over 90% are achieved with filtrate effluent average suspended solids concentrations of 10 parts-per-million (ppm) or less. Power usage is about 9 kilowatts (kW) per 1000 gpm of waste water process rate. Power usage may be reduced through the use of permanent magnet technology such as Wet High Intensity Magnetic Separation (WHIMS) technology and others.

Extremely high-flow-rate magnetic concentrators are also commercially available. Flow rates of 18,000 gpm have been achieved for magnetic separation processes in applications for steel mill waste and process waters.

The concentrated oily metallic solid output from the magnetic concentrator 76, shown by arrow 80, is mixed with a chemical release agent in the clarifier 70 or other mixing receptacle. The 5 chemical release agent may be nearly any surfactant and/or solvent with oil release properties. For instance, saponified aqueous systems or semi-aqueous systems may be used. Ideally, the chemical release agent should combine good metal-oil release 10 properties with good agent-oil release properties, that is, good cleaning and good oil-rejection properties. A preferred chemical release agent is TRIM® RINSE 200, an oil release agent available from the Master Chemical Corporation, Perrysburg, Ohio. TRIM® RINSE 200 has the following composition by weight percent: 10–20% sodium silicate, 1–10% amine carboxylate, 1–10% sodium borate, 1–10% of an anionic surfactant, 1–10% of sodium benzoate, 1–10% of a nonionic surfactant, and less than 1% dye, the balance being water. The agent is certified on its Manufacturer's Safety Data Sheet (MSDS) as nontoxic, and noncombustible. Other chemical release agents having similar oil-cleaning and/or releasing properties may also be used. Moreover, release agents without the oil rejection property of the preferred agents may be used in the practice of the present invention. These latter agents may be reused in the closed loop system until spent, that is, substantially saturated with oil, after which they may be removed from the system for disposal or further processing to recover the oil.

An amount of release agent sufficient to release substantially all of the oil from the metallic solids in a slurry should be used. Generally, the release agent is obtained in a 35 concentrated form which may first be diluted in water to a final concentration of about 500 parts-per million (ppm) to 100% by weight. A preferred concentration range is about 1 to 15% by weight. The diluted release agent, sometimes referred to as a process fluid, is then mixed with the slurry to be treated in a ratio from about 1/4:1 to 10:1 by weight, preferably 1:1 by weight to 4:1. A typical example is a 5% by weight concentration of release agent mixed 1:1 by weight with the oily metallic waste slurry to be treated.

The mixture is then directed through conduit 82, as shown by arrow 81, to a flow-through microwave process chamber 72. All microwave hardware components are readily scaled and commercially available. An example is a 15 gpm process chamber suitable for full production scale processing. Based on the 12 kW/gpm power-processing rate, and 180 kW microwave power source is required. Three 60 kW (180 kW total) microwave power sources are available, for instance, from Micro-Dry, Inc., Ky., U.S.A. Any application of microwave radiation sufficient to enhance separation of oil from metal particulate may be used. Preferred microwave applications are in the range of about 1–100 kW/gpm. Particularly preferred applications are in the range of about 10–20 kW/gpm.

Exposure to microwave energy rapidly cleans the oil from the metallic particles and promotes the separation of the oil from the mixture. The microwave processed slurry is then returned to the clarifier 70 or other receptacle, as shown by arrow 83, or directed to a second clarifier or other receptacle (not shown) and held to allow the metallic component 86 to settle. During settling in the clarifier 70, the oil rises to the top and is removed using skimmers 84, as shown by arrow 85, an efficient and low cost method.

The substantially oil free mixture containing the settled metallic component 86 and chemical release agent is then directed through conduits 82 and 88, as shown by arrow 87, to separation chamber 90 where the metallic component 86 is magnetically or otherwise separated from the mixture, as shown by arrow 91, using commercially available hardware 92, such as a drum filter.

The microwave process chamber may also be followed by a centrifuge or other means to separate, to continuously separate the solids from the process fluid. Further, the centrifuge may be followed by an oil-water coalescer, liquid-liquid centrifuge, or other means to continuously separate the oil from the oil release agent/microwave-process fluid. The solids may be further processed by single or multiple additional rinse stage(s) for enhanced cleaning. Also, a system for the recovery of the residual or spent oil release agent/microwave process fluid can be installed. Similarly, water purification or recovery systems can be installed to assist reuse of the process fluid, which may contain water, or to meet local discharge requirements. Three-phase centrifuges, which can combine some of these operations, also are available.

Following separation of the oil and metallic components of the original slurry, the chemical release agent is then returned to the clarifier 70 or other receptacle through conduit 94, as shown by arrow 89, in order to be reused.

Independent testing of the preferred chemical release agent, TRIM® RINSE 200, is certified on its Manufacturer's Safety Data Sheet (MSDS) to be nontoxic, and noncombustible. This certification indicates that there should be no disposal problems due to residual carry-off in the oil and metal products. Furthermore, such chemical release agents are reusable for a long period of time. The microwave process chemical release agent is confined to a closed-loop system, as described above, for its continual reuse.

The microwave-processed waste is transformed into individually reclaimed, recyclable components. The reclaimed clean oil can be sent to reprocessing sites readily accessible across the country. Similarly, the reclaimed clean metal can be sintered or otherwise recycled.

EXAMPLE

The method of the present invention was developed and tested in laboratory-scale experiments using hot strip rolling mill waste water samples. A 600 watt White Westinghouse consumer grade microwave oven was used to microwave process test samples contained in beakers. A precision, 0 to 500 watt, industrial 2.5 gigahertz (GHz) microwave power source, Model 420B manufactured by Micro-Now Co., was used to supply power into a flow-through waveguide process chamber. Two design versions of flow-through microwave process chambers, where one utilized an oven cavity and the other a microwave flow-through wave guide applicator were used. Both allowed flow rates up to approximately 1 gallon-per-minute (gpm). All microwave power sources which were used for the laboratory scale testing delivered about 500 watts at full setting. The 500 watts of available microwave power, in practice, limited the usable processing flow rates to about 0.05 gpm. However, off-the-shelf microwave power sources are available to beyond 60 kilowatts.

Initially, a Nalco® de-emulsifier was used to evaluate hot strip rolling mill waste sludge samples. Typical thickened waste sludge would not separate with the Nalco® de-emulsifier either by conventional heating or microwave heating of 500 milliliter samples in beakers. Simple decanting and 24 hour evaporation of the sludge suggested that the water was not tightly bound in an emulsion. After further evaluation, it was concluded that thickened sludge is not an emulsion, but a water slurry with oil, polymers and metallic solids.

Qualitative tests were performed with tetrafluoroethylene (TFE) solvent and a simple detergent at ambient and elevated temperatures to evaluate extraction of the oil from the sludge. Three TFE extractions removed nearly all of the oil. The detergent, at ambient and 60° C. elevated temperatures, had a small extraction effect. Microwave exposure of the thickened sludge with the detergent also had a similar but small effect.

A different methodology, that of the present invention, described below, was developed to separate the oil from the waste metal solids. A batch of magnetically concentrated oily metallic solids was prepared from industrial samples. The samples of magnetically concentrated hot strip rolling mill oily metallic waste solids were prepared by hand using a plastic coated bar magnet. The magnet had a one piece integral 18" handle and is typically used to retrieve stirring magnets. The magnet was slowly and continuously circulated in 5-gallon sample buckets of hot strip mill coolant water from a water treatment plant's main influent, as shown by arrow 22 in FIG. 1. The magnetically concentrated oily metallic solids were stripped from the magnet by hand and then placed into a calibrated syringe for measured injection into process vials.

Note that for large scale processes, motor driven magnetic roll (or drum) separators are available to extract fine metallic solids from coolant water. The systems are typically used in the machining industry and can handle coolant water flow rates to 300 gpm as a catalog listed item. Erie2 Magnetics, Inc. or Magnetool, Inc. is a source for an automated concentrator. Extremely high flow rate magnetic concentrators are also commercially available. Flow rates of 18,000 gpm being processed by magnetic separation in applications for steel mill waste and process waters have been cited.

Two 5 ml samples of magnetically concentrated hot strip rolling mill oily metallic waste solids were prepared and processed. A comparison of conventional heating and microwave processing was made using TRIM® RINSE 200 from the Master Chemical Corporation, Perrysburg, Ohio. Each sample was combined with the release agent, sealed in a process vial and heated according to the following protocol: Two samples, A and B, were mixed with the oil release agent. Sample A was then placed in a 60° C. water bath for 24 hours. Sample B was exposed to microwave radiation for 15 seconds, and then placed in a 60° C. water bath for 24 hours. The separation and settling of magnetically concentrated oily metallic waste samples are plotted in FIGS. 2A and 2B as functions of time. FIG. 2A represents the conventionally heated Sample A. FIG. 2B represents the microwave processed Sample B.

A comparison of the graphs shows that after 10 minutes, the microwave treatment had twice the separation or settling of metallic solids. The microwave processed sample (8) showed no significant change in the metallic solids settling after 30 minutes. The settled metal solids were about 25%, +/−5%, by volume. The conventionally heated sample (A) required 24 hours to achieve the same 25% settled metal solids result. Also note that the conventionally heated sample (A) was still clearing a mixed phase after 24 hours.

In summary, the microwave processed sample (B) substantially completed the separation of the oil from the metal solids in 30 minutes or less as compared to 24 hours for the conventionally heated sample (A). This is a factor of 48 times improvement (98% reduction) in separation time through the use of microwaves compared to conventional heating.

The microwave method for the separation of oily metallic solids of the present invention is useful in commercial processes. The processing can be implemented using commercially available magnetic concentration equipment and microwave hardware components. The microwave process equipment is extremely compact. The process hardware is capable of replacing the bulk of existing water treatment plant equipment in about one-tenth the area. The microwave process equipment may replace existing equipment, or may be retrofitted and there is no need to remove or shut down the existing cooling water treatment process equipment. The invention achieves a substantial cost savings to a hot strip mill operation, with the benefits of recycling and near zero waste production.

In summary, a process and apparatus for cleaning and reclamation of an industrial waste containing oily metallic solids has been described. The present invention has been described in terms of a preferred embodiment. The invention, however, is not limited to the embodiment depicted and described. Rather, the scope of the invention is defined by the appended claims.

What is claimed is:

1. A process for cleaning and reclamation of an industrial waste containing oily magnetic solids, comprising:
   - magnetically concentrating the oily magnetic solids in said waste to form concentrated solids;
   - mixing said concentrated solids with a chemical release agent to form a mixture;
   - applying microwave radiation to said mixture to separate oil components from metal components of said mixture; and
   - separately collecting said oil and said metal components of said mixture.

2. A process according to claim 1, wherein said industrial waste comprises hot strip rolling mill waste water effluent.

3. A process according to claim 1, wherein said chemical release agent comprises by weight about 10–20% sodium silicate, about 1–10% amine carboxylate, about 1–10% sodium borate, about 1–10% of an anionic surfactant, about 1–10% of sodium benzoate, about 1–10% of a nonionic surfactant, the balance being water.

4. A process according to claim 1, wherein said chemical release agent has a concentration by weight in the range of about 500 parts-per-million to 100% in water, and is mixed with said concentrated solids in a ratio from about 1/4:1 to 10:1 by weight.

5. A process according to claim 4, wherein said chemical release agent has a concentration in the range of about 1 to 15% by weight in water, and is mixed with said concentrated solids in a ratio from about 1:1 to 4:1 by weight.

6. A process according to claim 5, wherein said chemical release agent has a concentration of about 5% by weight in water, and is mixed with said concentrated solids in a ratio of about 1:1 by weight.

7. A process according to claim 1 wherein said step of applying microwave radiation comprises exposing said mixture to said radiation at a rate in a range of about 1–100 kilowatts per gallon of said mixture per minute.

8. A process according to claim 7, wherein said rate is in a range of about 10–20 kilowatts per gallon of said mixture per minute.

* * * * *